(12) United States Patent
Wobben

(10) Patent No.: US 7,806,660 B2
(45) Date of Patent: Oct. 5, 2010

(54) WIND POWER PLANT

(76) Inventor: Aloys Wobben, Argestrasse 19, Aurich (DE) 26607

( * ) Notice: Subject to any disclaimer, the term of this patent is extended or adjusted under 35 U.S.C. 154(b) by 813 days.

(21) Appl. No.: 10/587,603

(22) PCT Filed: Jan. 31, 2005

(86) PCT No.: PCT/EP2005/050387

§ 371 (c)(1),
(2), (4) Date: May 14, 2007

(87) PCT Pub. No.: WO2005/073551

PCT Pub. Date: Aug. 11, 2005

(65) Prior Publication Data

US 2007/0214723 A1     Sep. 20, 2007

(30) Foreign Application Priority Data

Feb. 2, 2004   (DE) .................. 10 2004 005 179

(51) Int. Cl.
*F03D 11/04* (2006.01)

(52) U.S. Cl. .............................. 416/146 R; 416/244 R; 416/DIG. 6

(58) Field of Classification Search .................. 52/40, 52/302.1, DIG. 6, 173.1, 173.2; 49/471, 49/400, 401, 402; 416/146 R, 244 R, 244 A, 416/DIG. 6, 248; 244/118.5, 129.4, 129.5; 440/8; 290/44, 45; 405/195
See application file for complete search history.

(56) References Cited

U.S. PATENT DOCUMENTS 4,842,224 A     6/1989   Cohen
6,285,090 B1 *  9/2001   Brutsaert et al. .............. 290/55
6,759,758 B2 *  7/2004   Torres Martinez ........... 290/55
7,372,171 B2    5/2008   Wobben ....................... 290/42

(Continued)

FOREIGN PATENT DOCUMENTS

DE        4143243        7/1993

(Continued)

OTHER PUBLICATIONS

U.S. Department of Transportation, "ADA Access to Passenger Vessels: Finding Safety Equivalence Solutions for Weathertight Doors with Coamings", XP 007908962, Sep. 2003, 43 pages.

*Primary Examiner*—Robert J Canfield
*Assistant Examiner*—Babajide Demuren
(74) *Attorney, Agent, or Firm*—Seed IP Law Group PLLC

(57) ABSTRACT

The invention concerns a wind power installation, in particular a wind power installation for the offshore region. The object of the invention is to overcome the previous difficulties and avoid disadvantages, in particular also to allow people to be constantly landed on the installation even when weather is so bad that flying by means of helicopters is no longer possible. A wind power installation comprising an entry and a space in the interior of the wind power installation, in which electrical or electronic components of the wind power installation are disposed, characterized in that provided between the entry of the wind power installation and the internal space in which the electronic components are disposed is a lock which prevents water that enters through the entry and/or salt-bearing or moist air which enters when the entry is opened from passing into the internal space of the installation.

14 Claims, 3 Drawing Sheets

U.S. PATENT DOCUMENTS

Figure 4:
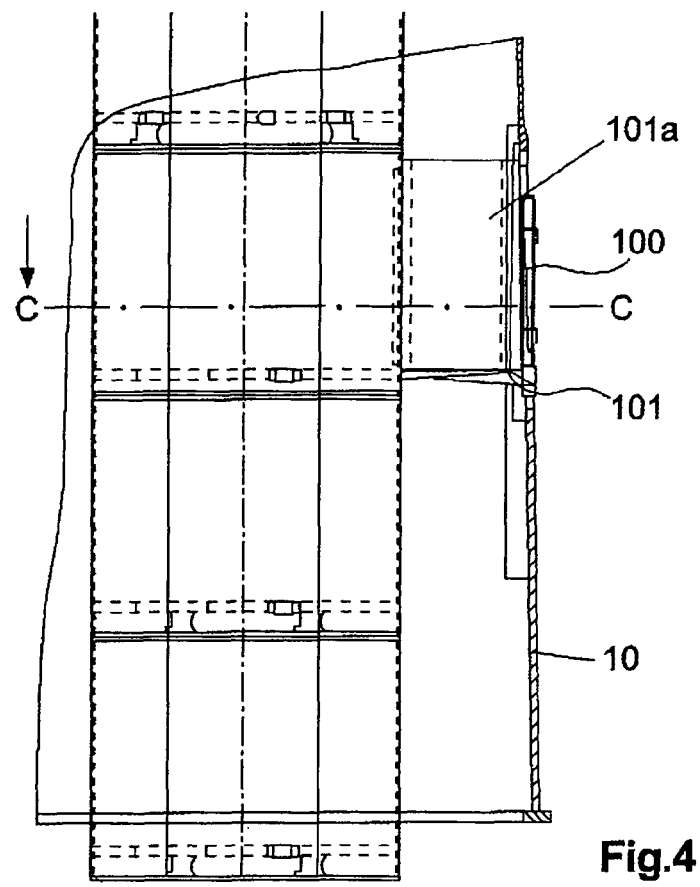

| | | | |
|---|---|---|---|
| 7,550,863 B2 * | 6/2009 | Versteegh | 290/44 |
| 2004/0103587 A1 * | 6/2004 | Fletcher et al. | 49/402 |
| 2005/0127091 A1 * | 6/2005 | Smith et al. | 222/1 |
| 2005/0173929 A1 * | 8/2005 | Wobben | 290/55 |
| 2006/0048564 A1 * | 3/2006 | Russell | 73/49.2 |
| 2008/0050234 A1 * | 2/2008 | Ingersoll et al. | 416/132 B |

FOREIGN PATENT DOCUMENTS

| | | |
|---|---|---|
| DE | 10304026.9 | 2/2003 |
| DE | 1389581 A1 | 8/2004 |
| DE | 10310036 A1 | 8/2004 |
| EP | 1134410 | 9/2001 |
| EP | 1985334 A2 | 2/2003 |
| EP | 1985334 A3 * | 7/2003 |
| GB | 20797 | 10/1908 |
| GB | 24481 | 11/1908 |
| GB | 136155 | 12/1919 |
| GB | 457231 | 11/1936 |
| GB | 2278736 A | 12/1994 |
| JP | 02041180 | 2/1990 |
| JP | 11350588 | 12/1999 |
| WO | 03066169 A1 | 8/2003 |
| WO | 2004067959 A1 | 8/2004 |
| WO | 2004076853 A1 | 9/2004 |

* cited by examiner

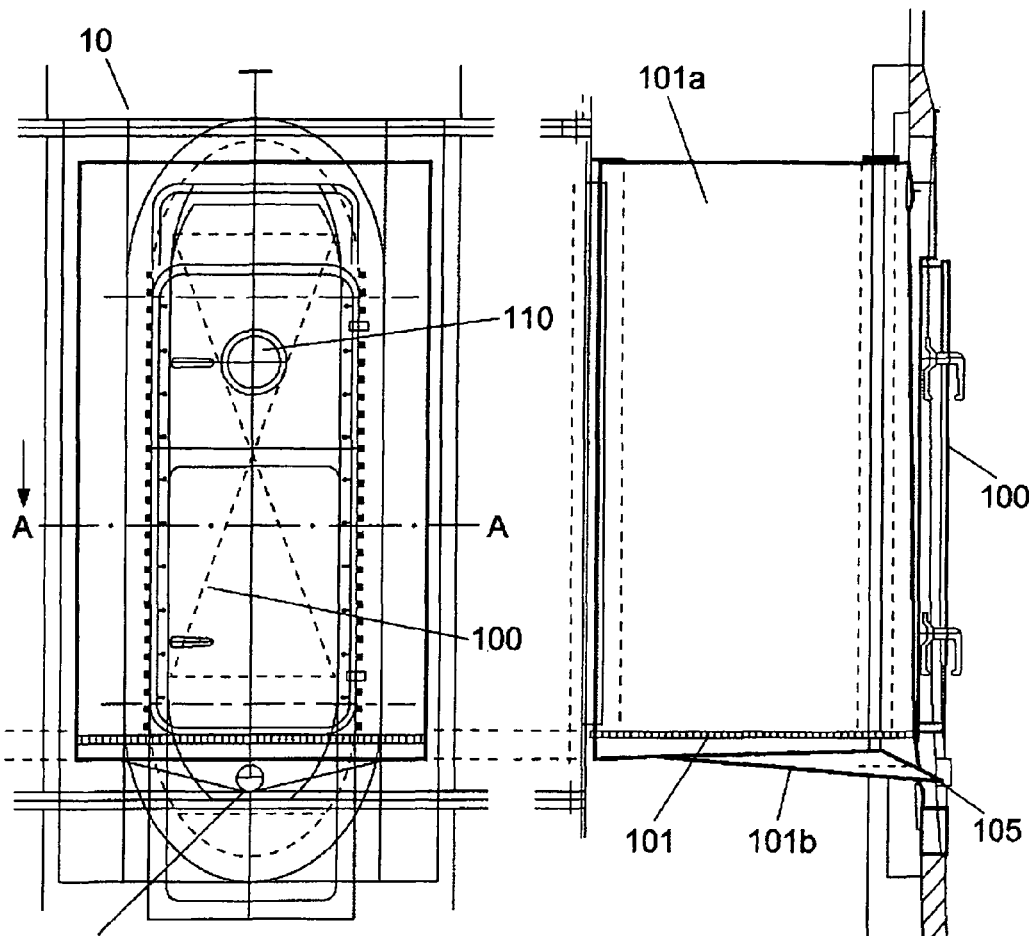
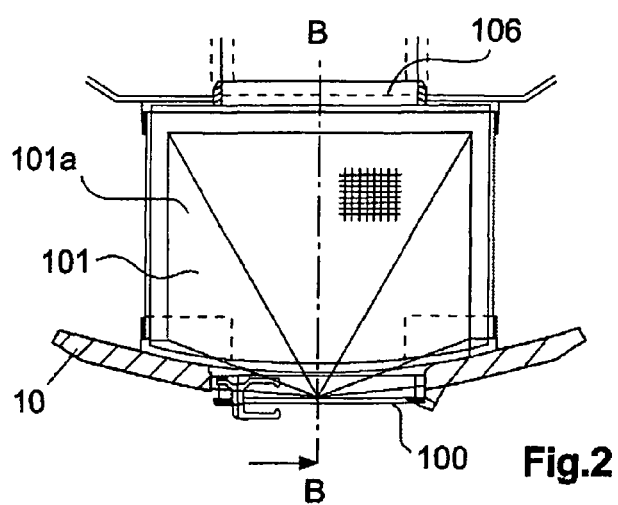
Fig.1
Fig.2
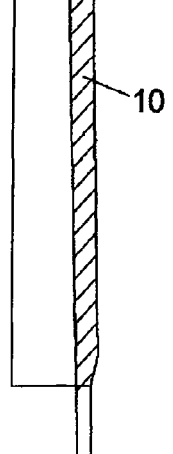
Fig.3

WIND POWER PLANT

BACKGROUND OF THE INVENTION

1. Field of the Invention

The invention concerns a wind power installation, in particular a wind power installation for the offshore region.

2. Description of the Related Art

Wind power installations generally have an entry and it is also known that electrical or electronic components are disposed in the interior of the wind power installation. That can take place either in what is referred to as an E-room or also in a plurality of such rooms and electrical or electronic components are typically inverters, control devices, transformers, measuring devices etc, that is to say devices which nowadays are already disposed in the interior of the wind power installation in order on the one hand to pass the electrical current and on the other hand to monitor, control, regulate etc the installation.

When such a wind power installation is verified as an offshore product, it is to be expected, at least when the wind power installation is standing in salt water, that, when the entry to the wind power installation is open, salt water and/or salt-bearing air can pass into the interior of the installation. Even if the entry is relatively high above sea level, very moist and thus very salt-bearing air can still pass into the interior of the installation.

Therefore the solution has already been adopted of entirely removing the entry from the pylon and moving the entry into the pod of the wind power installation, in which case there are provided devices for landing by means of a helicopter on the pod or at least letting down the operating personnel.

DE 198 59 628 C1 discloses an offshore wind power installation in which hollow components of the wind power installation are provided with an increased air pressure.

BRIEF SUMMARY OF THE INVENTION

The object of one embodiment of the invention is to overcome the previous difficulties and avoid disadvantages, in particular also to allow people to be constantly landed on the installation even when weather is so bad that flying by means of helicopters is no longer possible.

One embodiment of the invention attains that object with a wind power installation having the feature set forth in claim 1. Advantageous developments are set forth in the appendant claims.

In accordance with one embodiment of the invention it is provided that, viewed from outside the installation, a lock is provided behind the entry. That lock prevents the ingress of moisture, salt-bearing air etc into the interior of the installation and if necessary also involves suitable drainage to the exterior if water should pass into the interior of the lock. The lock is preferably of plastic material, for example glass fiber reinforced plastic material, that is to say a material which in any case is used for the production of wind power installations (for example the rotor blades). At the same time the lock can also serve as a clothes changing room as the operating personnel should (must) in any case wear special neoprene suits if they land on the installation from the outside and want to climb up it.

The lock now has at least two openings, namely an opening to the entry of the installation and a further opening to the interior of the installation, that is to say the rooms (E-room) with the electronic components. When the lock is opened in the direction of the E-room, air is urged out of the interior of the installation into the lock and therefore the staff must in practice pass into the E-room against the flow of air. The air from the interior of the installation is preferably sucked in the pod from the outside and urged into the interior of the pylon.

Accordingly a slightly higher air pressure prevails in the interior of the installation than in the interior of the lock when the latter is opened so that any ingress of water or moist air which is in the lock into the interior of the installation is reliably prevented.

If the lock is made from a non-rusting material, for example plastic material, it is also possible to reliably prevent the entire lock device from being detrimentally affected by salt-bearing water or salt-bearing air which has penetrated thereinto. The lock or at least parts thereof can be made from aluminum or Nirosta (rust-proof steel).

As a further addition to the foregoing described structure the lock also has its own shower or sanitary arrangements and rest arrangements, first aid equipment and so forth. If after all relatively large amounts of salt-bearing water or salt-bearing air should once have penetrated into the lock, the lock can be very substantially freed of the salt elements for example by means of the shower.

BRIEF DESCRIPTION OF THE SEVERAL VIEWS OF THE DRAWING(S)

Figure 5:
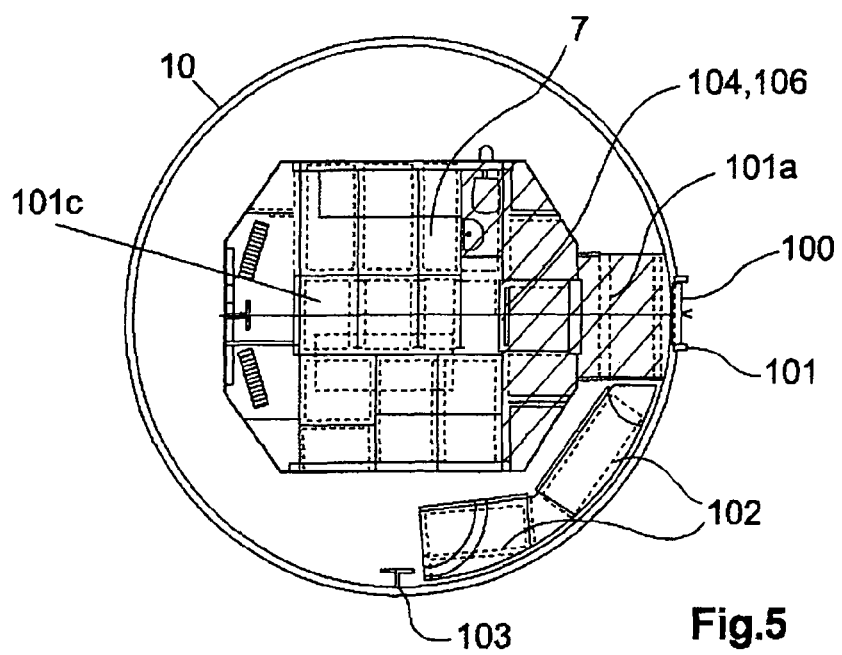
Figure 6:
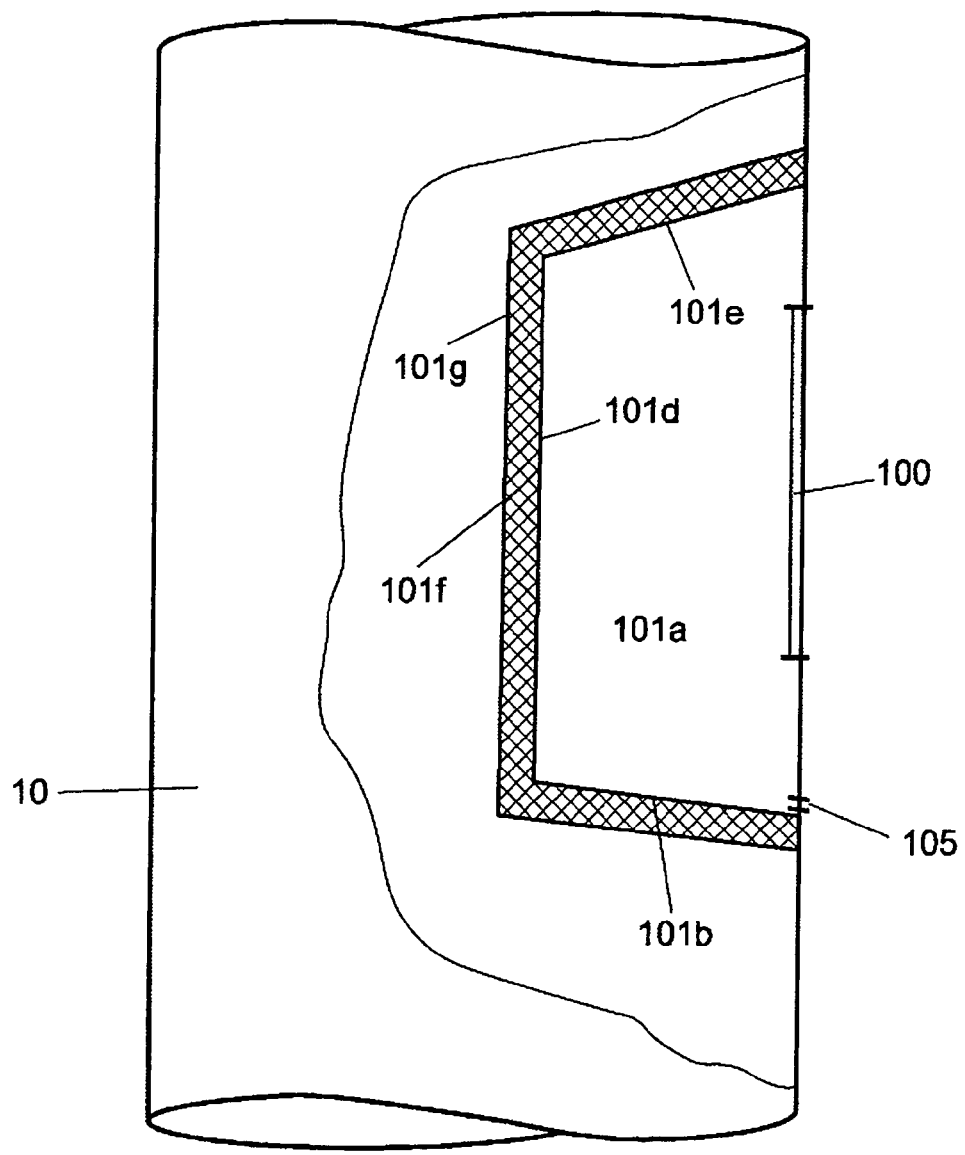

The invention is described in greater detail hereinafter by means of an embodiment illustrated in the drawing in which:

FIG. 1 shows a view from the exterior of the entry of a pylon of a wind power installation in accordance with the first embodiment, FIG. 2 shows a section through FIG. 1 on plane A-A, FIG. 3 shows a longitudinal section on plane B-B in FIG. 2, FIG. 4 shows a cross-section on an enlarged scale through the whole of the lower part of the pylon of the wind power installation, FIG. 5 shows a cross-section on an enlarged scale on the plane C-C in FIG. 4, and FIG. 6 shows a partial longitudinal section on the plane B-B in FIG. 2 in accordance with a second embodiment.

DETAILED DESCRIPTION OF THE INVENTION

FIGS. 1 to 5 show details of a wind power installation according to one embodiment of the invention with a power module. In that respect it is particularly described how a lock is provided between an outer entry to the pylon of the wind power installation and the interior 101c of the installation, that is to say where the important electronic and electrical parts of the power module are disposed. The lock prevents salt-bearing air or salt water from being able to penetrate into the interior of the installation and thus damage or destroy electrical or electronic parts, for the situation where the entire wind power installation is used as an offshore wind power installation.

FIG. 1 shows a view from the exterior of the entry door 100 of the wind power installation. The entry door 100 has a porthole 110. That porthole 110 makes it possible to see the weather conditions for example from the closed lock. On the basis thereof it is then possible to take a decision as to whether it is or is not possible to leave the wind power installation. Provided in the lower region of the lock is an opening 105 through which water in the interior of the lock can directly drain off to the exterior again.

FIG. 2 shows once again a portion on an enlarged scale on plane A-A in FIG. 1 and also a portion in the lock entry room of FIG. 5. It is also possible to see here the platform 101 and the door 100 which leads to the exterior. There is also a further door 106 through which it is possible to pass into the interior of the wind power installation.

FIG. 3 shows a longitudinal section on plane B-B in FIG. 1. Thus FIG. 3 also shows a further detail view from FIG. 4. It can be clearly seen there that the floor of the lock entry room 101a is fixed to the pylon interior itself and that floor is preferably moisture-permeable so that, upon opening of the entry door 100, if spray water or the like passes into the lock entry room 101a, it can drain away through the floor. Beneath the floor which is preferably also in the form of a lattice grid, there is a water-impermeable plate 101b which is inclined outwardly towards the pylon wall. When therefore spray water or also moisture from the clothing of the operating personnel drips off into that space through the lattice grid, that water can flow off again outwardly directly by way of the plate 101b through an opening 105.

As can also be seen from FIG. 5 but also from FIGS. 3 and 4, the lock entry room 101a can be closable by a further door 106. The door 106 is also preferably moisture-tight and watertight and separates the lock entry room 101a from the lock central room with the sanitary arrangements already described above.

FIG. 4 is a partial longitudinal section through the lower pylon 10 showing various levels at which the power module is subdivided under some circumstances while FIG. 4 at top right shows the outer entry 100 to the interior of the pylon. That entry is usually a gate 100 or a door which is closable in each case. As can already be seen from FIG. 4, a platform 101 extends inwardly from that door 100 substantially perpendicularly to the pylon wall 10, the platform 101 preferably being directly connected to the pylon 10 so that the platform can already be walked upon when the pylon 10 is erected.

FIG. 5 shows a view from above of the structure shown in FIG. 4, from which it is possible to see the tube module 7 as well as the door 100 and the platform 101. Laterally relative to the platform there are further platforms 102, preferably lattice grids, which are also fixedly mounted to the pylon wall 10 and which make it possible that, when in a very early stage, after construction of the wind power installation, a person can already pass through the door 100 over the above-described platforms 101, 102 to the ladder 103 provided in the pylon.

As can be seen from the plan view, but as also from FIG. 4, directly adjoining the platform 101 towards the interior of the pylon is a room which optionally together with the room which is provided above the platform 101 forms a closed lock 101a. The surface of that lock room 101a is shown in hatching in FIG. 5.

Operating personnel pass from the exterior into the lock room 101a and in that room can possibly change their clothing or at least stay therein for a short time. Sanitary equipment is also installed in that room. In the lock room 101a there is a further door 104, 106 which can lead to the interior of the pylon, that is to say to the items of equipment of the power module.

The door 104, 106 is preferably moisture-tight so that, if under some circumstances moisture passes into the lock room, it cannot pass through the door 104, 106 into the interior of the installation. Furthermore that door can also be of a smoke-tight nature in order to close off the lock in smoke-tight or gas-tight relationship with respect to the interior of the installation. In the event of smoke being generated in the pylon the lock can thus serve as an emergency room which affords protection from toxic gases.

Provided in the interior of the wind power installation are means for controlling the air pressure within the wind power installation. In that respect the air pressure is preferably controlled in such a way that it is higher within the wind power installation than in the interior 101a of the lock so that, upon opening of the lock, water or moist air is prevented from penetrating into the interior of the installation. For that purpose the air in the interior of the wind power installation is preferably sucked in from the exterior in the pod and urged into the interior of the pylon.

FIG. 6 shows a partial longitudinal section on plane B-B in FIG. 2 in accordance with a second embodiment. In this case the second embodiment is essentially based on the first embodiment shown in FIGS. 1 to 5. Accordingly FIG. 6 shows a pylon 10 of a wind power installation with an entry 100 which leads into a lock room 101a. In this arrangement the lock room 101a has a floor 101b, a wall 101d and a ceiling 101e. In this case those walls represent the inside walls of the lock 101a. Also shown is an outside wall 101g arranged at a predetermined spacing relative to the inside wall. A barrier material 101f is arranged in the intermediate space between the inside wall 101b, 101d, 101e and the outside wall 101g. The outside wall 101g is preferably made from steel and the inside wall 101b, 101d, 101e of the lock is preferably made from a glass fiber reinforced plastic material GRP. The barrier material 101f is preferably in the form of insulating material which is known for example from house building. Thus the barrier material 101f can be made for example from rock wool, glass wool or the like. As an alternative thereto it is also possible to use other barrier materials which are poor thermal conductors and which at the same time are warmth-resistant or heat-resistant.

By virtue of the multi-shell configuration of the wall of the lock in the interior of the wind power installation, the lock region can serve as an escape refuge room in the case of a fire in the wind power installation. Thus the lock room 101a on the one hand is smoke-tight and on the other hand fire-resistant. Thus, the choice of steel as the outside wall 101g of the lock region provides a material which is not combustible. As however steel is a good thermal conductor, in addition to the outside wall 101g there are provided a barrier or insulating material 101f as well as an inside wall 101b, 101d and 101e of the lock 101a, in which case the inside wall is not made from steel but from another material which is preferably insensitive in relation to the salt-bearing sea air.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation comprising:
a pylon;
an entry in the pylon;
an internal space in the pylon interior of the wind power installation, in which electrical or electronic components of the wind power installation are disposed; and
a lock provided between the entry of the wind power installation and the internal space in which the electronic components are disposed, the lock preventing moisture that enters through the entry when the entry is opened from passing into the internal space of the installation and having a drain through which water that passes into the lock can drain away.

2. The wind power installation according to claim 1 wherein the lock is formed from a non-rusting material.

3. The wind power installation according to claim 1 wherein the lock also serves as a clothes changing room.

4. The wind power installation according to claim 1 wherein the air is urged out of the interior of the wind power installation into the lock when the lock is opened to the interior.

5. The wind power installation according to claim 1 wherein the air pressure in the interior of the installation is greater than in the lock.

6. The wind power installation according to claim 1 wherein the lock is directly connected to the pylon.

7. The wind power installation according to claim 1 wherein the lock has a second door which leads to the internal space, the second door being smoke-tight.

8. The wind power installation according to claim 1 wherein the lock has an inside wall and an outside wall, insulating material being arranged between the inside wall and the outside wall.

9. The wind power installation according to claim 8 wherein the insulating material has a material which is heat-resistant and a poor thermal conductor.

10. The wind power installation according to claim 2 wherein the non-rusting material is a plastic material.

11. The wind power installation according to claim 2 wherein the non-rusting material is glass fiber reinforced plastic material.

12. A wind power installation comprising:
a pylon;
an entry in an exterior wall of the pylon;
an internal space within the pylon containing electrical components of the wind power installation;
a lock between the entry of the wind power installation and the internal space containing the electrical components, the lock preventing moisture that enters through the entry when the entry is opened from passing into the internal space of the installation; and
a drain through which water that passes into the lock can drain to an exterior of the pylon.

13. The wind power installation according to claim 12 wherein air is urged out of the interior space of the wind power installation into the lock when the lock is opened to the interior space.

14. The wind power installation according to claim 12 wherein prior to opening the lock the air pressure in the interior space of the installation is greater than in the lock.

* * * * *

UNITED STATES PATENT AND TRADEMARK OFFICE
CERTIFICATE OF CORRECTION

PATENT NO. : 7,806,660 B2  Page 1 of 1
APPLICATION NO. : 10/587603
DATED : October 5, 2010
INVENTOR(S) : Aloys Wobben It is certified that error appears in the above-identified patent and that said Letters Patent is hereby corrected as shown below:

Title Page Item 56, Foreign Patent Documents
"De 1389581 A1 8/2004" should read, --EP 1389581 A1 2/2004--.

Signed and Sealed this
Tenth Day of May, 2011

David J. Kappos
*Director of the United States Patent and Trademark Office*